(12) United States Patent
Aupperle et al.

(10) Patent No.: US 7,394,367 B1
(45) Date of Patent: Jul. 1, 2008

(54) KEYPAD FOR BUILDING AUTOMATION

(75) Inventors: Donald P. Aupperle, Seattle, WA (US);
William T. Beierwaltes, Loveland, CO (US); Hugh P. Adamsom, Boulder, CO (US); Dennis Clark, Fort Collins, CO (US); Eric Rinard, Fort Lupton, CO (US)

(73) Assignee: Colorado VNET, LLC, Loveland, CO (US)

( * ) Notice: Subject to any disclaimer, the term of this patent is extended or adjusted under 35 U.S.C. 154(b) by 228 days.

(21) Appl. No.: 11/273,864

(22) Filed: Nov. 15, 2005

Related U.S. Application Data

(60) Provisional application No. 60/628,142, filed on Nov. 16, 2004, provisional application No. 60/713,417, filed on Sep. 1, 2005.

(51) Int. Cl.
*G08B 21/00* (2006.01)

(52) U.S. Cl. .................... 340/540; 340/541; 340/530; 345/168; 345/175; 345/184

(58) Field of Classification Search ............... 340/540, 340/541, 530; 345/168, 175, 184
See application file for complete search history.

(56) References Cited

U.S. PATENT DOCUMENTS

| | | | |
|---|---|---|---|
| 4,158,432 A | * | 6/1979 | VAN Bavel ............... 714/46 |
| 4,447,692 A | * | 5/1984 | Mierzwinski ............ 219/720 |
| D327,471 S | | 6/1992 | Frick |
| 5,128,654 A | | 7/1992 | Griffin et al. |
| D343,386 S | | 1/1994 | Mueller |
| D376,130 S | | 12/1996 | Elwell et al. |
| D377,789 S | | 2/1997 | Wang et al. |
| D380,202 S | | 6/1997 | Matthes |
| D380,452 S | | 7/1997 | Mix et al. |
| D380,737 S | | 7/1997 | Weir et al. |
| D390,211 S | | 2/1998 | Yates et al. |
| D392,947 S | | 3/1998 | Lino |
| 5,739,753 A | | 4/1998 | Porter |
| D398,905 S | | 9/1998 | Bergenham |
| D409,505 S | | 5/1999 | Janda et al. |

(Continued)

FOREIGN PATENT DOCUMENTS

EP 0813328 * 12/1997

(Continued)

OTHER PUBLICATIONS

"RCS: KPG8 Multi Menu Keypad and KPL-7 7-Button Keypad," (2002), 2 pages, Residential Control Systems, Inc., Rancho Cordova, CA.

(Continued)

*Primary Examiner*—Tai Nguyen
(74) *Attorney, Agent, or Firm*—Peter B. Scull; Berenbaum, Weinshienk & Eason Trenner Law Firm

(57) ABSTRACT

An exemplary embodiment of a keypad for building automation may comprise a sensing layer operable to detect user input. The sensing surface configured with a plurality of switching fields assigned to different automation functions. A printed label is layered over the sensing surface for identifying the different automation functions to a user. Control circuitry is operatively associated with the sensing surface. The control circuitry receives user input corresponding to at least one of the switching fields on the sensing surface, and the control circuitry generates a signal for executing the automation function assigned to the switching field at an automation device.

25 Claims, 10 Drawing Sheets

U.S. PATENT DOCUMENTS

| | | |
|---|---|---|
| D412,897 S | 8/1999 | Attwood et al. |
| 5,946,209 A | 8/1999 | Eckel et al. |
| D422,971 S | 4/2000 | Leib |
| 6,046,730 A * | 4/2000 | Bowen et al. ............... 345/168 |
| 6,121,889 A | 9/2000 | Janda et al. |
| D435,798 S | 1/2001 | Aiello et al. |
| D455,406 S | 4/2002 | Pinchuk |
| D467,557 S | 12/2002 | Eckel et al. |
| 6,581,846 B1 | 6/2003 | Rosen |
| D480,722 S | 10/2003 | Griffin |
| 6,750,407 B2 | 6/2004 | Song et al. |
| D494,585 S | 8/2004 | Aupperle |
| 6,850,159 B1 | 2/2005 | Mudge |
| D502,466 S | 3/2005 | Aupperle |
| D538,234 S | 3/2007 | Aupperle |
| 2002/0135476 A1 | 9/2002 | McKinney et al. |
| 2006/0114245 A1 * | 6/2006 | Masters et al. ............... 345/175 |

OTHER PUBLICATIONS

U.S. PTO Office Action issued Dec. 28, 2006 in U.S. Appl. No. 10/793,596, 13 pages.

www.merten.de/html/en/1163.html; 2 pages printed from Internet on Oct. 29, 2004 (re-printed on Aug. 24, 2006).

www.matsci.com/content.html; 1 page printed from Internet on Oct. 20, 2004 (re-printed on Aug. 24, 2006).

AMX, Welcome to the AMX New Products, www.amx.com/new-products-public.asp, 12 pages, copyright 2005 AMX Corporation.

* cited by examiner

US 7,394,367 B1

KEYPAD FOR BUILDING AUTOMATION

PRIORITY CLAIM

This application claims priority to U.S. provisional application No. 60/628,142, filed Nov. 16, 2004 (the '142 application), and to U.S. provisional application No. 60/713,417, filed Sep. 1, 2005 (the '417 application). The '142 and '417 applications are hereby incorporated by reference as though fully set forth herein.

TECHNICAL FIELD

The described subject matter relates to building automation, and more particularly to keypads for building automation.

BACKGROUND

The ability to control one or more functions in a building (e.g., lighting, heating, air conditioning, audio, security systems, etc.) is known as building automation. Building automation may be used, for example, to automatically operate various lighting schemes in a house. Of course building automation may be used to control any of a wide variety of other functions, more or less elaborate than controlling lighting.

Low-end building automation systems are typically provided with switches, dials and knobs for controlling specific automation devices in a prescribed manner and cannot be readily customized or changed for individual users. More sophisticated building automation systems may use computer controls. These computer controls may be daunting to the user and therefore the user fails to realize the full potential of the building automation system.

SUMMARY

An exemplary embodiment of a keypad for building automation may comprise a sensing layer operable to detect user input. The sensing surface is configured with a plurality of switching fields assigned to different automation functions. The switching fields may be configured, e.g., as discrete areas or "buttons," or as a switching matrix. A printed label is layered over the sensing surface for identifying the different automation functions to a user. Control circuitry is operatively associated with the sensing surface. The control circuitry receives user input corresponding to at least one of the switching fields on the sensing surface, and the control circuitry generates a signal for executing the automation function assigned to the switching field at an automation device.

An exemplary embodiment of a method may comprise: assigning a plurality of switching fields on a sensing layer of a keypad to different automation functions, identifying the different automation functions on a printed label for the keypad, generating an electrical signal in response to user input on at least one of the plurality of switching fields, and converting the electrical signal into a control signal for an automation device, the control signal including instructions for executing the automation function assigned to the switching field.

DETAILED DESCRIPTION

Exemplary embodiments of keypad devices are described herein for use in building automation, e.g., for controlling lighting, audio, video, HVAC utilities, security, etc. An exemplary keypad device may include an optional transparent cover overlaid on a switching element (e.g., a capacitive, resistive, optical matrix, sonic, and/or heat sensitive switching element). Switching fields (or switch locations) may be defined on the switching element using program code, and printed labels may be provided (e.g., between the transparent panel and the switching element or vice versa) to identify the switching fields to a user.

In operation, the user may select one or more automation functions by touching the transparent panel in an area labeled with one or more functions. The switching element detects the user's selection (e.g., the switching fields being activated), and control circuitry responds by signaling an automation device to execute the corresponding function.

Exemplary embodiments of the keypad enable ready integration with other visual displays (e.g., TFT panels), provides a design that integrates with the environment, include a "slim" profile, and have no moving parts. The keypad may also be configured with customized switch layouts. Accordingly, the keypad is easy to use and may be readily customized and changed for individual users.

Although exemplary implementations are described herein with reference to building automation, it is noted that the scope is not limited to such use. The invention may also find application in a number of different types of control systems now known or later developed in which keypad devices may be implemented.

Figure 1:
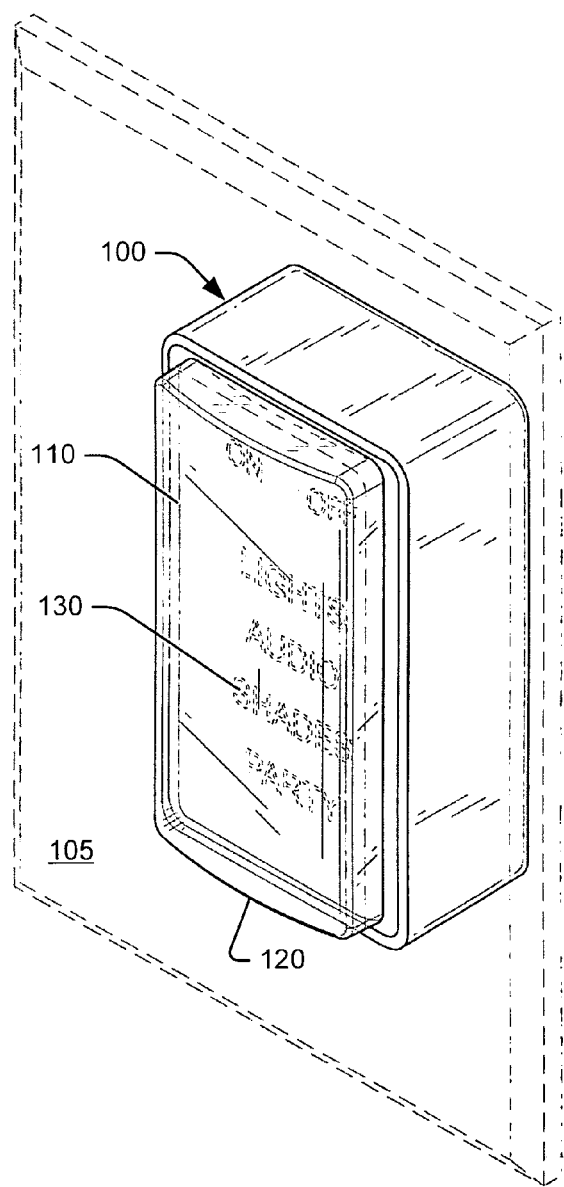
FIG. 1 is a front perspective view of an exemplary keypad with a convex transparent cover, shown as the keypad may be mounted to a wall.
Figure 1A:
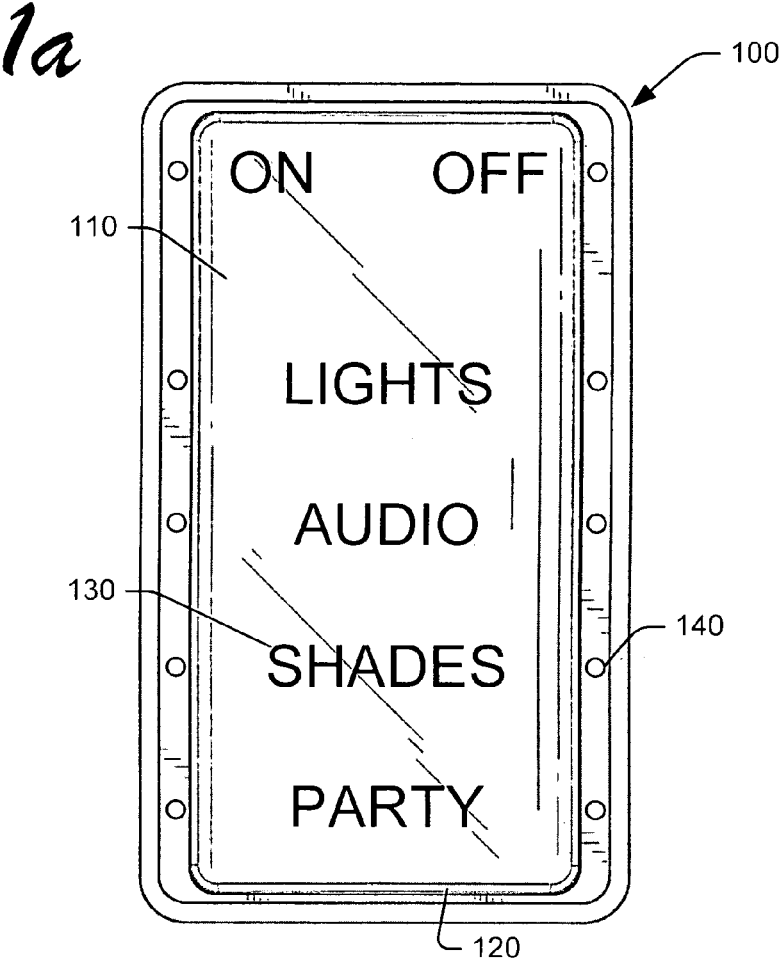
FIG. 1a is front plan view of the exemplary keypad shown in FIG. 1.
Figure 1B:
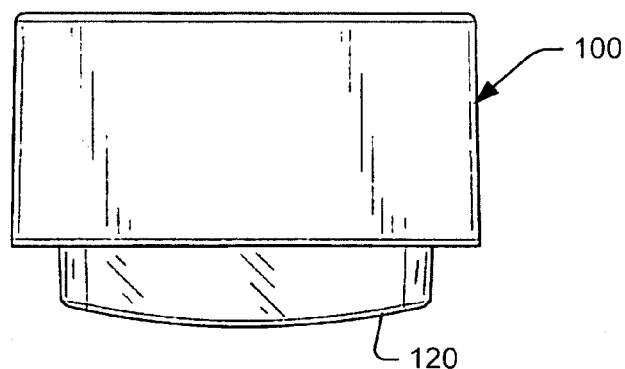
FIG. 1b is a top plan view of the exemplary keypad shown in FIG. 1.

FIG. 1 is a front perspective view of an exemplary keypad 100 with a convex transparent cover, shown as the keypad may be mounted to a wall 105. FIG. 1a is a front plan view of the exemplary keypad 100 shown in FIG. 1. FIG. 1b is a top plan view of the exemplary keypad 100 shown in FIG. 1.

Keypad 100 may include a sensing surface 110 for receiving input from a user (e.g., when the user touches or presses surface 110). Sensing surface 110 may be implemented as a plurality of switching elements which are configured to detect a user's input (e.g., capacitance resulting from a finger on or near the surface 110). Exemplary embodiments of the sensing surface 110 are described in more detail below with reference to FIGS. 4 and 5.

A lens or transparent cover 120 fabricated, e.g., of glass or a plastic material, may be provided over the sensing surface 110. Transparent cover 120 protects the sensing surface 110 (e.g., from dust, debris, and wear) while still allowing the user to see one or more legend or labels 130, without inhibiting the ability detect input by the sensing surface 110.

Label 130 identifies for the user various functions available via the keypad 100, e.g., by touching the sensing surface 110. For example, different areas of the sensing surface 110 may correspond to different functions, as illustrated in FIG. 1 by the labels for Lights, Audio, Shades, and Party.

Indicator lights 140 (e.g., LEDs shown in FIG. 1a) may be provided to indicate a user's selections. For example, indicator light 140 next to the label 130 may indicate the shades are open or closed. Openings may be formed through the label 130 so that the light can shine through the label 130. These openings may be slightly smaller than the lights 140, allowing for some tolerance in alignment. In another embodiment, light pipe indications may be provided outside the label area. In yet another embodiment, the label 130 may serve as a semi-transparent mask over the lights 140. Such an implementation may enable the light to shine through the label. Different colors provided on the label 130 also enable different color lighting using the same color indicator light (e.g., broad spectrum or white light).

Backlighting may also be provided behind the label 130, e.g., so that the keypad 100 is visible in dark rooms. In an exemplary embodiment, the balance of the label is clear (or translucent). Alternatively, a semi-clear label may be implemented to serve as a diffuser for the backlighting. The label 130 may then be custom printed on a first surface with the desired legends and a continuous background color across its whole width.

Keypad 100 may also be provided with control circuitry for controlling various functions (e.g., building automation devices). Control circuitry is described in more detail below with reference to FIG. 6. For now, it is enough to understand that the control circuitry may be provided on a circuit board and the sensing surface 110 mounted to it. The entire assembly can then be mounted in the wall 105, as better illustrated with reference to FIG. 2.

Figure 2:
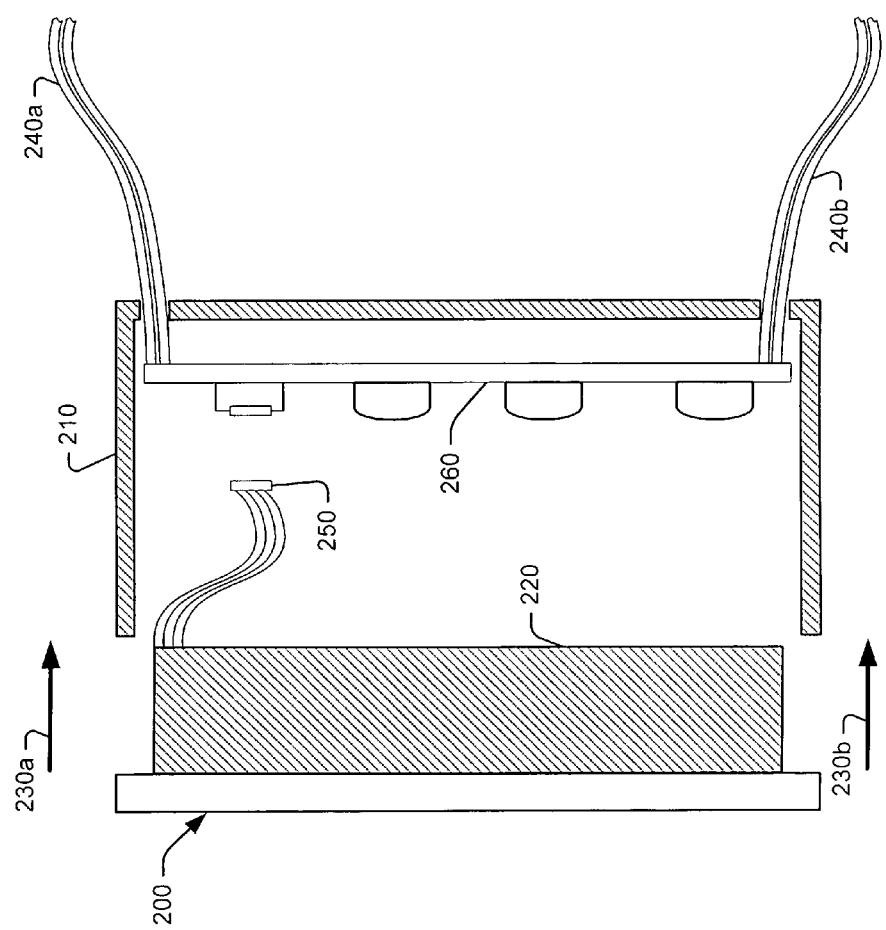
FIG. 2 is a cross-sectional view of an exemplary keypad illustrating installation in a wall box.

FIG. 2 is a cross-sectional side plan view of an exemplary keypad 200 (e.g., the keypad 100 in FIG. 1) illustrating installation in a wall box 210. In an exemplary embodiment, the wall box 210 may be a standard plastic or metal junction box (or "J-Box"). Accordingly, the keypad 200 is configured to fit within standard household electrical enclosures and appear similar to other commercially available cover plates (e.g., DECORA® cover plates). It is noted, however, that the keypad 200 is not limited to any particular size or configuration.

As mentioned above, a circuit board 220 including control circuitry and optional backlighting element(s) may be mounted in housing 210. The entire assembly may in turn be mounted in wall box 210, as illustrated by arrows 230a and 230b.

In an exemplary embodiment, the keypad 200 may be connected into a building automation system, e.g., via electrical and/or data wiring 240a and 240b. Keypad 200 may include electrical and/or data connections 250 which connect to a controller board 260 (e.g., in the wall box 210). For purposes of illustration, the controller board 260 may be a dimmer control module, such as the dimmer control module described in more detail in U.S. Pat. No. 6,927,546 of Adamson, et al. Dimmer control module may receive input from the keypad 200 and generate a control signal for lighting to adjust the intensity of the lighting.

Before continuing, it is noted that keypad 200 is not limited to use with any particular type of device (e.g., the dimmer control module). Likewise, the keypad 200 does not need to be connected directly to a controller device. In other embodiments, the keypad 200 may be linked to one or more automation devices indirectly via an automation system (e.g., a CAN bus, Ethernet network, etc.) to control one or more function in the automation system. For purposes of illustration, the keypad 200 may be implemented in a CAN bus building automation system such as the building automation system described in U.S. Patent Publication No. 2004/0176877 of Hesse, et al. However, the keypad 200 is not limited to use in any particular environment.

Figure 3:
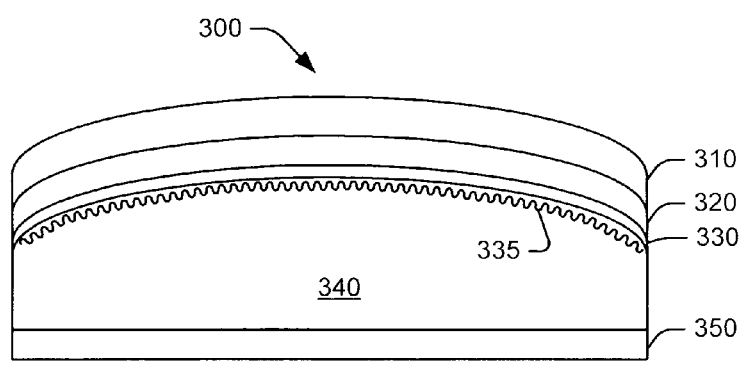
FIG. 3 is a cross-sectional diagrammatic view of an exemplary keypad illustrating various layers of the keypad.

FIG. 3 is a cross-sectional diagrammatic view of an exemplary keypad 300 illustrating various layers of the keypad 300. Exemplary keypad 300 may include a cover 310, a label 320, a sensing surface 330, an adhesive 335, a structural backing 340, and a backlight 350. It is noted that although the various layers are shown substantially in contact with one another, in other embodiments, there may exist airspace between one or more of the layers. It is also noted that the label 320 is not limited to being overlaid on the sensing surface 330. In other embodiments, the label 320 may be positioned behind the sensing surface 330.

In an exemplary embodiment, the cover 310 is manufactured from a transparent or semi-transparent material (e.g., plastic or glass). However, the cover 310 does not need to be transparent or semi-transparent. In other embodiments, the cover 310 may be opaque and the label 320 may be provided over the surface of the cover 310. Or in another embodiment, the label 320 may be coated (e.g., with a plastic material), thereby serving as a label and protective cover.

In an exemplary embodiment, the label 320 may be a paper or plastic label which can be printed on using standard printing devices, such as, e.g., laser or inkjet printers. The label 320 may also be translucent or semi-translucent. Other embodiments of the label 320 may include, but are not limited to, die-cut labels and micro-perforated sheets.

The label 320 may also be removable and replaceable, before or after installation, e.g., without having to remove the keypad from the wall box. For example, a user may remove cover 310 to access the label 320. As mentioned above, the label 320 may also be integrated, or provided as part of the cover 310.

In an exemplary embodiment, the sensing surface 330 may be implemented as an indium tin oxide (ITO) surface. An ITO surface may be sputter-deposited on a thin plastic film to form one or more "hot areas" or a matrix. These hot areas or matrix may be assigned to one or more switching fields and are electrically connected to the control circuitry (e.g., control circuitry 600 shown in FIG. 6), which may convert user input on the sensing surface 330 into binary data (e.g., 1's and 0's) for controlling one or more devices and/or functions. Accordingly, if the user touches on or near the sensing surface 330, an electrical signal is generated indicative of the switching field. The electrical signal is issued to the control circuitry to generate an output signal corresponding to the function labeled on the keypad 300.

The sensing surface 330 may be calibrated based on the thickness of the cover 310 and label 320 so that input can be detected through the layers, optionally even if the user is wearing gloves. In an exemplary implementation, the sensing surface 330 is self-calibrating, e.g., based on user input over time.

An optional pressure-sensitive adhesive layer 335 may be provided, e.g., integral with the structural backing 340. Any suitable adhesive layer 330 may be used. For example, the adhesive layer 335 may be a tacky adhesive, such as the type of adhesive used on POST-IT or "sticky" notes. Adhesive layer 335 serves to attach the sensing surface 330 to the structural backing 340. It is noted that adhesive may also be provided between one or more of the other layers shown in FIG. 3.

The backlight 350 may include one or more light-emitting diodes (LEDs). It is noted, however, that the keypad 300 is not limited to use with LED backlighting. In other implementations, LED fiber optics may be used, as may an electroluminescent panel.

In an exemplary embodiment, the backlight 350 may be operatively associated with a photo sensor that controls the backlight 350 and intensity of the backlight 350. Accordingly, the backlight 350 may be responsive to external or ambient lighting, e.g., the intensity of light from the backlight 350 may decrease with decreasing ambient light and increase with increasing ambient light. In addition, the backlight 350 may be programmed by the user (e.g., for the minimum and maximum illumination levels).

Figure 4:
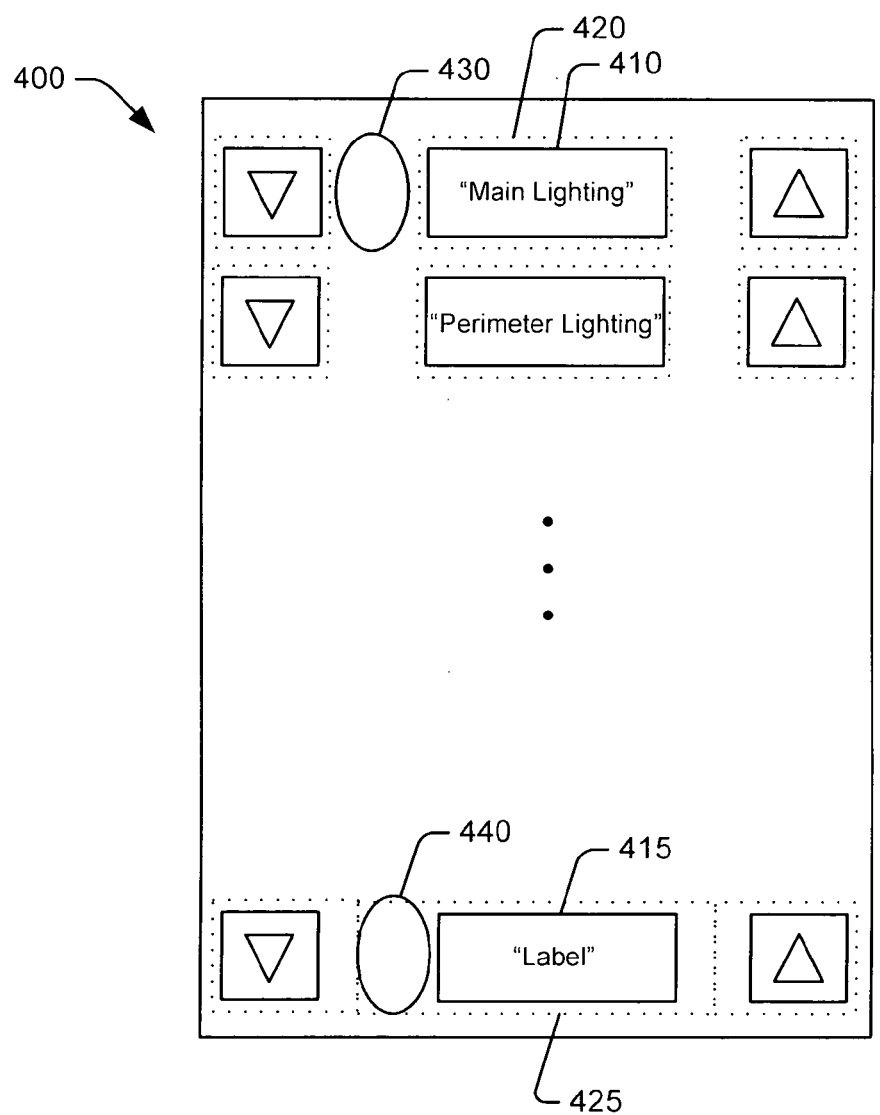
FIG. 4 is an illustration of an exemplary sensing surface which may be implemented for a keypad.

FIG. 4 is an illustration of an exemplary sensing surface 400 which may be implemented for a keypad (e.g., the keypad 100 shown in FIG. 1). Exemplary sensing surface 400 may include switch labels (e.g., the switch label 410) and corresponding switching elements (e.g., switching element 420 shown by dashed lines around switch label 410). The switching elements 420 are "hot areas" or sensing locations on the sensing surface 400 for receiving user input.

In an exemplary embodiment, switching elements 420 may be implemented for detecting capacitive input on the sensing surface. The capacitive surface responds to a change in capacitance caused by a change in the dielectric, namely the air space between the ITO traces on the substrate. In other words, the sensing surface responds to the presence of a finger (or other object), even without physical contact on the sensing surface. Accordingly, labels may be positioned between the sensing surface and the object (e.g., the user's finger) and when the object is on or near the paper, it still causes a control signal.

It is noted, however, that the keypad is not limited to a capacitive sensing surface. Other exemplary embodiments may include thermal sensing, and/or resistive sensing switching elements, to name only a few examples. The switching elements 420 may be electrically connected to control circuitry for implementing the functions corresponding to the labels 410.

It is noted that the sensing surface 400 is not limited to any particular type or duration of touch. The sensing surface 400 may be implemented to detect any of a wide variety of input, including but not limited to, a finger, stylus, and/or other object. For example, the sensing surface 400 may be implemented as a secure surface for particular implementations (e.g., a security system). Such an embodiment may require detection of the user's fingerprint in order to activate the sensing surface.

The sensing surface 400 may include "dead spots." For example, if the user were to touch an area as illustrated by oval 430, nothing would happen. While this may be desirable in some implementations, in other embodiments, the sensing surface 400 may detect adjacent touch without the user having to physically touch the switching elements 420.

In yet another embodiment, the switching elements 420 may be extended beyond the label to reduce or altogether eliminate dead spots, e.g., as shown by switching element 425 surrounding label 415. In the example shown in FIG. 4, if the user were to touch an area as illustrated by oval 440, it would be detected by switching element 425 to activate the function corresponding to label 415. Still other embodiments are also contemplated, such as the embodiment described in more detail below with reference to FIG. 5.

Figure 5:
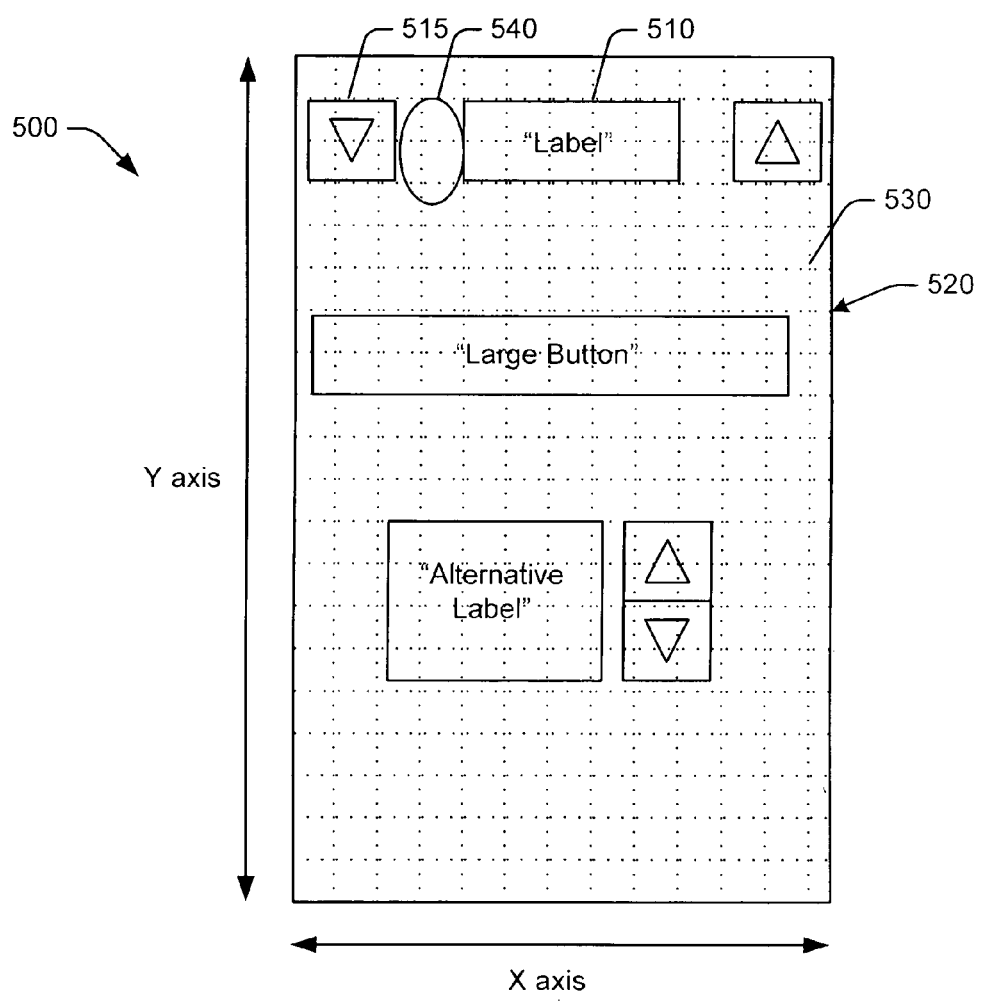
FIG. 5 is an illustration of another exemplary sensing surface which may be implemented for a keypad.

FIG. 5 is an illustration of another exemplary sensing surface 500 which may be implemented for a keypad (e.g., the keypad 100 shown in FIG. 1). Exemplary sensing surface 500 may include switch labels (e.g., the switch label 510). In this embodiment, the sensing surface 500 includes a switching grid 520 including a plurality of grid elements (e.g., the grid element 530).

In an exemplary embodiment, the switching grid 520 has a sensing resolution of 253 by 253 (or 64,009 grid elements 530). However, the sensing surface 500 is not limited to any particular resolution. The resolution may depend on a number of considerations including, but not limited to, user preferences and design considerations.

In operation, the capacitance generated by touching the grid elements 530 is measured, and an electrical signal delivers the capacitance to control circuitry for determining the position of touch (e.g., X, Y coordinates).

In an exemplary embodiment, the grid elements may be positioned such that there are no dead spots, and anywhere a user touches is detected (e.g., in oval 540 between labels 510 and 515). Such an embodiment enables the use of any of a wide variety of different type, shape, and/or position of labels on the sensing surface 500, e.g., as illustrated by the labels shown in FIG. 5.

Again, it is noted that the sensing surface 500 is not limited to any particular type of detection mechanism. Other exemplary embodiments may include, thermal sensing, and/or resistive-sensing switching elements.

Figure 6:
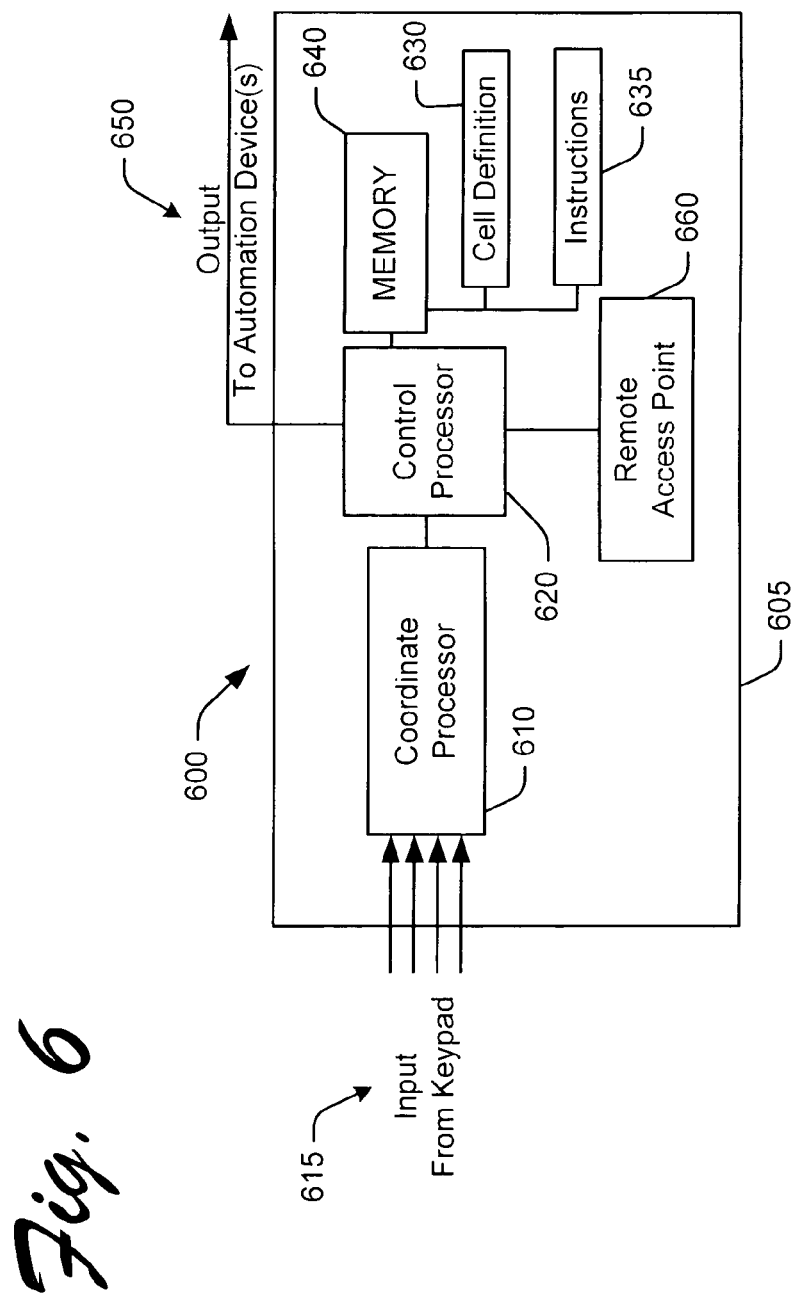
FIG. 6 is a high-level schematic diagram of exemplary control circuitry which may be implemented for receiving input from a keypad and generating output for a device operatively associated with the keypad.

FIG. 6 is a high-level schematic diagram of exemplary control circuitry 600 which may be implemented for receiving input from a keypad (e.g., the keypad 100 in FIG. 1) and generating output for a device (e.g., the controller board 260 in FIG. 2) operatively associated with the keypad. Control circuitry 600 may be implemented, e.g., as one or more integrated circuit mounted to a circuit board 605.

Control circuitry 600 may include a coordinate processor 610 which receives input 615 from the keypad. For example, input 615 from the keypad may include electronic signal(s) corresponding to a user's touch. Coordinate processor 610 outputs a grid space or X, Y coordinates corresponding to the user's touch. A control processor 620 operatively associated with the coordinate process 610 receives the X, Y coordinates (or other suitable data indicative of the user's touch) and determines a function indicative of the user's touch (e.g., a user selection). The touch space may be interpolated if two fingers are on the surface at the same time.

In an exemplary embodiment, the control processor 620 accesses cell definitions 630 and instruction data store 635 from memory 640. Cell definitions 630 may be implemented, e.g., as one or more data structure identifying functions corresponding to the X, Y coordinates where the user has touched the keypad. Instruction data store 635 may also be implemented, e.g., as one or more data structure including control instructions for executing the functions.

For purposes of illustration, a user may touch the keypad in an area labeled with an arrow for increasing lighting in a room. One or more electrical signals are generated at the sensing surface and issued to the coordinate processor 610. Coordinate processor 610 receives the electrical signal(s) and may generate an X, Y coordinate (5, 10). Control processor receives the X, Y coordinate (5, 10) and accesses memory 640 to determine which function(s) the X, Y coordinate (5, 10) corresponds to. In this example, the X, Y coordinate (5, 10) corresponds to the function "increase lighting." The control processor 620 then accesses the instruction data store 635 and generates output 650 for increasing the lighting (e.g., a signal including control instructions). The output may be issued to one or more automation device (e.g., the controller board 260 in FIG. 2) to increase lighting in the room.

In addition to processing input 615 from the keypad and generating output 650 to control one or more devices and/or functions, the control circuitry 600 may also be implemented to configure (or reconfigure) the keypad. Although any suitable method may be implemented for configuring or programming the keypad, in an exemplary embodiment a user may operate the same switching field (or "key") on the keypad to program one or more of the switching fields for one or more functions. For example, the user may press a program "key" to enter a programming mode, and then select from various pre-programmed devices or functions to configure one or more switching field. Alternatively, the user may program the keypad using a personal computer (PC), personal digital assistant (PDA), etc. to define new functions and/or sensing areas of the keypad in program code. The user may also program the luminance of the status LEDs and/or backlighting using similar techniques.

In another exemplary embodiment, the control circuitry 600 may include a remote access point 660 to enable an external remote control (e.g., infrared, BLUETOOTH®, Internet connection, etc.) allowing control and/or programming the keypad without touching it. In another exemplary embodiment, an audible and/or kinetic indicator (not shown) may be provided for tactile feedback (e.g., sounding "beeps" or vibrating when the user touches designated areas of the sensing surface) to enhance the perceived switching action for the user. Optionally, the user may also program the level of the audible and/or kinetic indicator (e.g., using the techniques described above). Other input sensors (not shown) may also be provided, such as, e.g., radio frequency (RF), light, and temperature, to name only a few examples.

Figure 7:
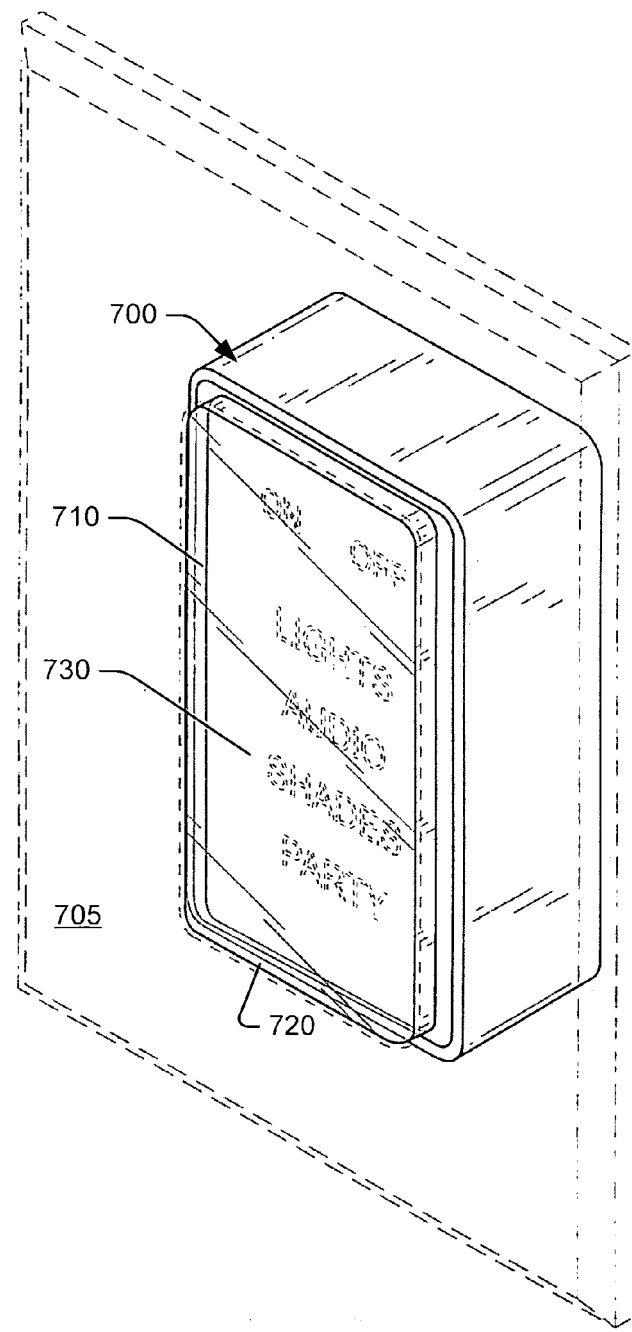
FIG. 7 is a front perspective view of another exemplary embodiment of a keypad with a flat transparent cover, shown as the keypad may be mounted to a wall.
Figure 7A:
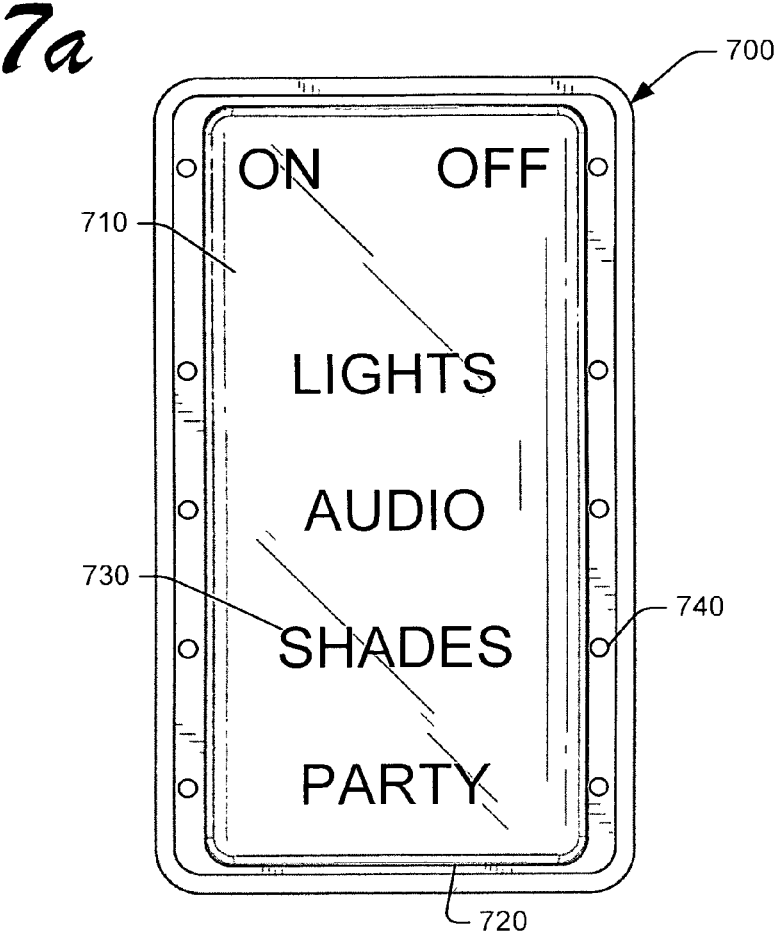
FIG. 7a is a front plan view of the exemplary keypad shown in FIG. 7.
Figure 7B:
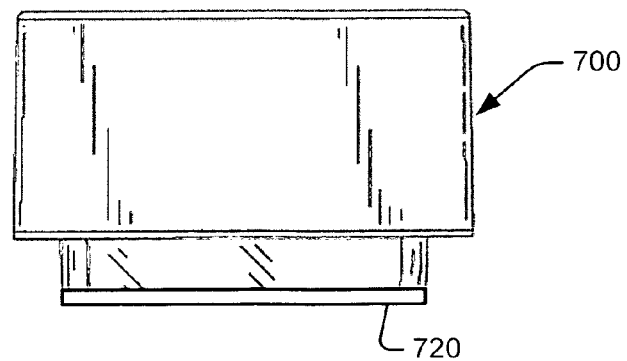
FIG. 7b is a top plan view of the exemplary keypad shown in FIG. 7.

FIG. 7 is a front perspective view of another exemplary embodiment of a keypad 700 with a flat transparent cover, shown as the keypad may be mounted to a wall 705. FIG. 7a is a front plan view of the exemplary keypad 700 shown in FIG. 7. FIG. 7b is a top plan view of the exemplary keypad 700 shown in FIG. 7. It is noted that 700-series reference numbers are used to refer to corresponding elements in the embodiment of keypad 100 shown and described above with reference to FIGS. 1, 1a, and 1b, and may not be described again with reference to FIGS. 7, 7a, and 7b.

Keypad 700 may include a sensing surface 710 for receiving input from a user (e.g., when the user touches or presses the surface 710). Sensing surface 710 may be overlaid by a lens or transparent cover 720. Label 730 identifies for the user various functions available via the keypad 700.

In this embodiment, the transparent cover 720 is flat. The transparent cover 720 may be mounted such that it is flush with the wall 705. Alternatively, the transparent cover 720 may stick out from the wall, e.g., such as a conventional light switch plate.

Figure 8:
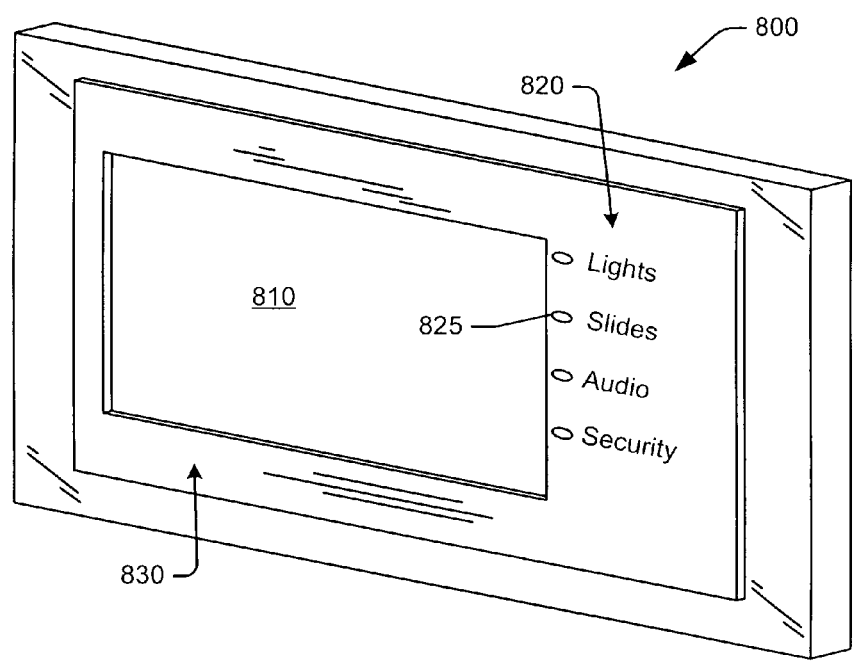
FIG. 8 is a front perspective view of another exemplary embodiment of a keypad with an integrated display device.

FIG. 8 is a front perspective view of another exemplary embodiment of a keypad 800 with an integrated display device. In an exemplary embodiment, the display device is a thin film transistor (TFT) display device 810, although other display devices now known or later developed may also be implemented. Keypad 800 includes a switch portion 820 adjacent the TFT device 810. In this embodiment, the user may interface with functions provided by the switch portion 820 even if the TFT device 810 is turned off or in a hibernate mode. Accordingly, the keypad 800 is still operable, e.g., to turn on the lights when a user enters a darkened room because the user is still able to access the keypad functionality (e.g., lighting controls) provided in the switch portion 820 even if the TFT device 810 remains inactive.

Switch portion 820 may be implemented, e.g., as an ITO deposition layer which forms an array of switch elements on a panel adjacent the TFT device. As discussed above (e.g., with reference to FIGS. 4 and 5), this array implements a software-defined sensing area where custom printed labels may be applied. Optionally, indicator lights (e.g., the LED 825) and/or backlighting may also be provided as described above.

It is noted that the keypad 800 may also include an active border 830 surrounding the TFT device 810, and/or covering the TFT display. For example, a transparent panel including the ITO deposition layer may be provided over the active border 830 and/or the TFT display itself. Indeed, the transparent panel may also be provided over the switch portion 820 to enable switching via the switch portion 820.

According to such an embodiment, the TFT device 810 may be implemented to display functions (and/or programming options), and the user may interact with the keypad 800 as indicated by the labels in switch portion 820 and/or by touching the active border 830 and/or TFT display as indicated by output on the TFT display.

It is noted that in other implementations, the display need not be a TFT device. For example, the display may also include organic LED, electronic paper technologies, or other types of graphical or visual display devices now known or later developed.

In addition to the specific embodiments explicitly set forth herein, other aspects and implementations will be apparent to those skilled in the art from consideration of the specification disclosed herein. It is intended that the specification and illustrated embodiments be considered as examples only.

What is claimed is:

1. A keypad apparatus, comprising:
   a sensing layer operable to detect user input, the sensing surface configured with a plurality of switching fields assigned to different automation functions;
   a printed label layered adjacent the sensing surface for identifying the different automation functions to a user;
   a backlight behind the sensing surfaces, wherein the backlight intensity changes based on user preferences and ambient light levels; and
   control circuitry operatively associated with the sensing surface, the control circuitry receiving user input corresponding to at least one of the switching fields on the sensing surface, and the control circuitry generating a signal for executing at least one automation function assigned to the switching field at an automation device.

2. The keypad apparatus of claim 1, wherein the sensing surface is reconfigurable by reassigning pre-defined automation functions to the switching fields.

3. The keypad apparatus of claim 1, wherein the sensing surface is reconfigurable by defining new automation functions for the switching fields.

4. The keypad apparatus of claim 1, wherein sensing surface includes at least one of the following: an ITO deposition layer on a thin-film, a plurality of capacitive-sensing cells, a plurality of thermal-sensing cells, and a plurality of resistive-sensing cells.

5. The keypad apparatus of claim 1, wherein sensing surface is configured as a switching grid free of any dead spots.

6. The keypad apparatus of claim 1, further comprising a transparent cover overlaying the printed label.

7. The keypad apparatus of claim 6, wherein the transparent cover is removable without removing the keypad from a mounting.

8. The keypad apparatus of claim 1, further comprising a cover integral with the printed label.

9. The keypad apparatus of claim 8, wherein the cover is removable without removing the keypad from a mounting.

10. The keypad apparatus of claim 1, further comprising at least one indicator light adjacent at least one of the switching fields, the at least one indicator light indicative of status of an automation function labeled adjacent the at least one indicator light.

11. The keypad apparatus of claim 1, further comprising a display device adjacent a keypad portion including the sensing surface, the keypad portion operable even if the display device is deactivated.

12. The keypad apparatus of claim 11, wherein the sensing surface overlays both the keypad portion and the display device.

13. The keypad apparatus of claim 12, wherein the sensing surface overlaying the display device is free from printed labels.

14. The keypad apparatus of claim 11, further comprising an active border around at least part of the display device for activating at least one automation function identified bye the display device.

15. A method comprising:
reconfigurably assigning a plurality of switching fields on a capacitive sensing layer of a keypad to different automation functions;
identifying the different automation functions on a printed label for the keypad;
generating an electrical signal in response to user input on at least one of the plurality of switching fields;
backlighting the capacitive sensing surface;
changing the intensity of the backlighting based on user preferences and ambient light levels; and
converting the electrical signal into a control, signal for an automation device, the control signal including instructions for executing the automation function assigned to the switching field.

16. The method of claim 15, further comprising reassigning pre-defined automation functions to the switching fields.

17. The method of claim 15, further comprising defining new automation functions in program code for assigning to the switching fields.

18. The method of claim 15, further comprising indicating X and Y coordinates in the electrical signal, the X and Y coordinates corresponding to the user input.

19. The method of claim 15, further comprising indicating a status of each automation function.

20. The method of claim 15, further comprising receiving input on a keypad portion of a display device even if the display device is deactivated.

21. A keypad for building automation, comprising:
first layer means for receiving user input;
second layer means for identifying different automation functions, wherein the first layer means and second layer means are arranged in reverse order;
third layer means for covering the first layer means and the second layer means; and
control means for converting user input received at the first layer means to a control signal for executing at least one building automation function identified by the second layer means.

22. The keypad of claim 21, further comprising means for receiving input on the first layer means of a display device even if the display device is deactivated.

23. A keypad apparatus, comprising:
a sensing layer operable to detect user input, the sensing surface configured with a plurality of switching fields assigned to different automation functions;
a printed label layered adjacent the sensing surface for identifying the different automation functions to a user;
further comprising a display device adjacent a keypad portion including the sensing surface, the keypad portion operable even if the display device is deactivated, wherein the sensing surface overlays both the keypad portion and the display device; and
control circuitry operatively associated with the sensing surface, the control circuitry receiving user input corresponding to at least one of the switching fields on the sensing surface, and the control circuitry generating a signal for executing at least one automation function assigned to the switching field at an automation device.

24. The keypad apparatus of claim 23, wherein the sensing surface overlaying the display device is free from printed labels.

25. A keypad apparatus, comprising:
a sensing layer operable to detect user input, the sensing surface configured with a plurality of switching fields assigned to different automation functions;
a printed label layered adjacent the sensing surface for identifying the different automation functions to a user;
an active border around at least part of the display device for activating at least one automation function identified by the display device; and
control circuitry operatively associated with the sensing surface, the control circuitry receiving user input corresponding to at least one of the switching fields on the sensing surface, and the control circuitry generating a signal for executing at least one automation function assigned to the switching field at an automation device.

* * * * *